(12) United States Patent
Duncan et al.

(10) Patent No.: US 6,864,647 B2
(45) Date of Patent: Mar. 8, 2005

(54) LINEAR MOTOR

(75) Inventors: Gerald David Duncan, Auckland (NZ); John Henry Boyd, Holland, MO (US)

(73) Assignee: Fisher & Paykel Limited, Auckland (NZ)

( * ) Notice: Subject to any disclaimer, the term of this patent is extended or adjusted under 35 U.S.C. 154(b) by 0 days.

(21) Appl. No.: 10/880,389

(22) Filed: Jun. 29, 2004

(65) Prior Publication Data

US 2004/0234394 A1 Nov. 25, 2004

Related U.S. Application Data

(62) Division of application No. 10/018,323, filed as application No. PCT/NZ00/00105 on Jun. 21, 2000, now Pat. No. 6,809,434.

(30) Foreign Application Priority Data

Jun. 21, 1999 (NZ) ............................................. 336375
Oct. 19, 1999 (NZ) ............................................. 500519

(51) Int. Cl.[7] ............................................. H02K 33/00
(52) U.S. Cl. ........................ 318/114; 318/135; 318/119; 417/44.11; 310/12; 310/15; 310/36
(58) Field of Search ................................. 310/12–15, 30, 310/36; 417/44.1, 44.11, 416–417, 212; 318/114, 119, 129–135

(56) References Cited

U.S. PATENT DOCUMENTS

| | | |
|---|---|---|
| 3,886,419 A | 5/1975 | Omura et al. |
| 4,036,018 A | 7/1977 | Beale |
| 4,179,899 A | 12/1979 | Katayama |
| 4,283,920 A | 8/1981 | Kainuma et al. |
| 4,291,258 A * | 9/1981 | Clark et al. .................. 318/124 |
| 4,320,448 A | 3/1982 | Okuda et al. |
| 4,346,318 A | 8/1982 | Shtrikman |
| 4,349,757 A | 9/1982 | Bhate |
| 4,602,174 A | 7/1986 | Redlich |
| 4,836,757 A | 6/1989 | Curwen et al. |
| 4,838,771 A | 6/1989 | Kikuchi |
| 4,854,833 A | 8/1989 | Kikuchi et al. |
| 4,857,814 A | 8/1989 | Duncan |
| 5,055,011 A | 10/1991 | Mori |
| 5,496,153 A | 3/1996 | Redlich |
| 5,525,845 A | 6/1996 | Beale et al. |
| 5,656,896 A | 8/1997 | Ogiwara et al. |
| 5,658,132 A | 8/1997 | Akazawa et al. |
| 5,742,492 A | 4/1998 | Akazawa et al. |
| 5,955,799 A | 9/1999 | Amaya et al. |
| 5,980,211 A * | 11/1999 | Tojo et al. ..................... 417/45 |
| 6,074,172 A | 6/2000 | Huang |
| 6,437,524 B1 * | 8/2002 | Dimanstein ................. 318/135 |
| 6,501,240 B2 | 12/2002 | Ueda et al. |
| 6,506,030 B1 * | 1/2003 | Kottke ......................... 417/328 |
| 6,685,438 B2 * | 2/2004 | Yoo et al. ................. 417/44.11 |

FOREIGN PATENT DOCUMENTS

| | | |
|---|---|---|
| EP | 246468 | 11/1987 |
| EP | 0726394 | 8/1996 |
| JP | 9250449 | 9/1997 |
| SU | 792511 | 12/1980 |
| WO | WO9835428 | 8/1998 |
| WO | WO0016482 | 3/2000 |
| WO | WO0148379 | 7/2001 |
| WO | WO0179671 | 10/2001 |

* cited by examiner

Primary Examiner—Thanh Lam
(74) Attorney, Agent, or Firm—Trexler, Bushnell, Giangiorgi, Blackstone & Marr, Ltd.

(57) ABSTRACT

The present invention provides an improved design of linear motor as well as an improved control strategy. The design allows for a shorted stator, where the armature magnets are controlled to reciprocate to a greater maximum displacement that for a equivalent conventional linear motor. The control strategy is such that a minimum of external sensors are required. The linear motor is driven at its resonant frequency ensuring optionally efficient operation. A determination of the maximum current is made based on a relationship with the resonant frequency and the evaporating temperature/pressure of the vapor entering the compressor. The current is then limited to control the maximum displacement to avoid damage.

13 Claims, 10 Drawing Sheets

Motor EMF and Displacement Waveforms

FIGURE 8b

Motor Equivalent Circuit

FIGURE 15
Motor Current Waveform and Timing

FIGURE 9

FIGURE 10
Maximum Current as a function of Evaporation Temperature and Frequency

FIGURE 11
Block diagram of the motor control circuit

FIGURE 12

FIGURE 13
Control Microcomputer Motor Control Timing Flow Chart

FIGURE 14
Calculation of Commutation Time Limit based on Evap Temp & Stroke Time

LINEAR MOTOR

This application is a divisional application of Ser. No. 10/018,323, filed on Dec. 11, 2001, now U.S. Pat. No. 6,809,434, and assigned a filing date under 35 U.S.C. §371 of Apr. 5, 2002, which is the United States National Stage application of PCT/NZ00/00105 which has an international filing date of Jun. 21, 2000 and which was published in English on Dec. 28, 2000 under International Publication Number WO 00/79671.

TECHNICAL FIELD

This invention relates to a compact linear motor including free piston compressors (also called vibrating and linear compressors) for vapour compression systems and in particular a control system to prevent failure or damage due to unwanted changes of compression level caused by changes to ambient temperature or operating conditions.

BACKGROUND ART

Compressors, for example refrigerator compressors, are conventionally driven by rotary electric motors. However, even in their most efficient form, there are significant losses associated with the crank system that converts rotary motion to linear reciprocating motion. Alternatively a rotary compressor which does not require a crank can be used but again there are high centripetal loads, leading to significant frictional losses. A Linear compressor driven by a linear motor would not have these losses, and can be designed with a bearing load low enough to allow the use of aerostatic, gas bearings as disclosed in U.S. Pat. No. 5,525,845.

Linear reciprocating motors obviate the need for crank mechanisms which characterise compressors powered by rotating electric motors and which produce high side forces requiring oil lubrication. Such a motor is described in U.S. Pat. No. 4,602,174. U.S. Pat. No. 4,602,174 discloses a linear motor design that is extremely efficient in terms of both reciprocating mass and electrical efficiency. This design has been used very successfully in motors and alternators that utilise the Stirling cycle. It has also been used as the motor for linear compressors. However, in the case of compressors designed for household refrigerators the design in U.S. Pat. No. 4,602,174 is somewhat larger and more costly than is desirable for this market.

The piston of a free piston compressor oscillates in conjunction with a spring as a resonant system and there are no inherent limits to the amplitude of oscillation except for collision with a stationary part, typically part of the cylinder head assembly. The piston will take up an average position and amplitude that depend on gas forces and input electrical power. Therefore for any given input electrical power, as either evaporating or condensing pressure reduces, the amplitude of oscillation increases until collision occurs. It is therefore necessary to limit the power as a function of these pressures.

It is desirable for maximum efficiency to operate free piston refrigeration compressors at the natural frequency of the mechanical system. This frequency is determined by the spring constant and mass of the mechanical system and also by the elasticity coefficient of the gas. In the case of refrigeration, the elasticity coefficient of the gas increases with both evaporating and condensing pressures. Consequently the natural frequency also increases. Therefore for best operation the frequency of the electrical ten powering the compressor needs to vary to match the mechanical system frequency as it varies with operating conditions.

Figure 8A:
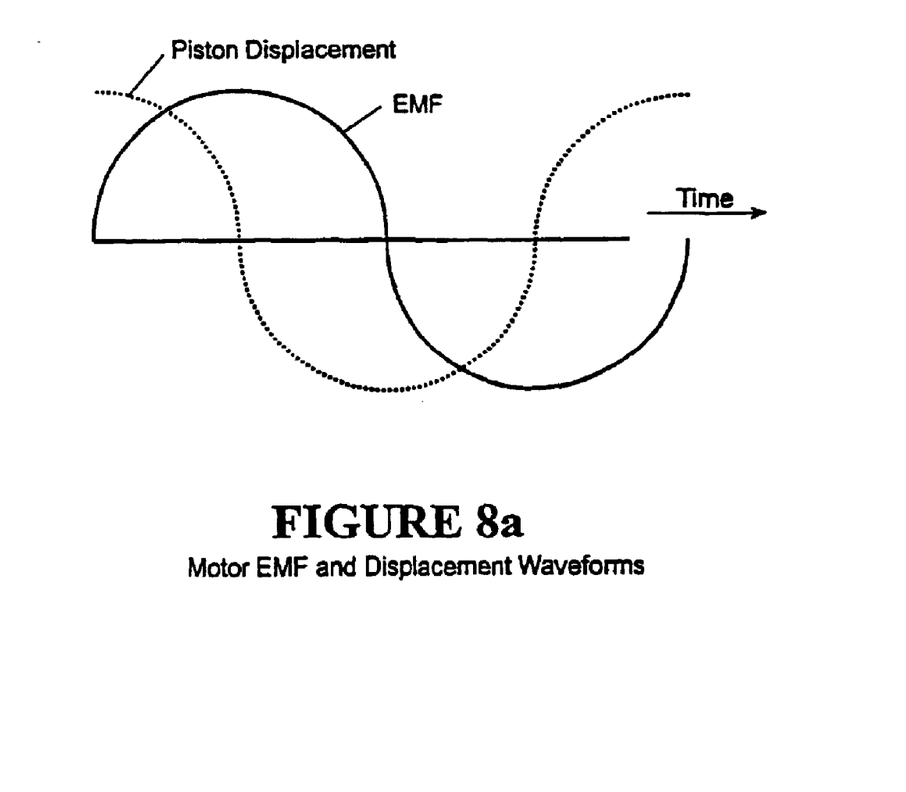
FIG. 8a shows motor piston displacement and back EMF waveforms for a free piston compressor motor.
Figure 8B:
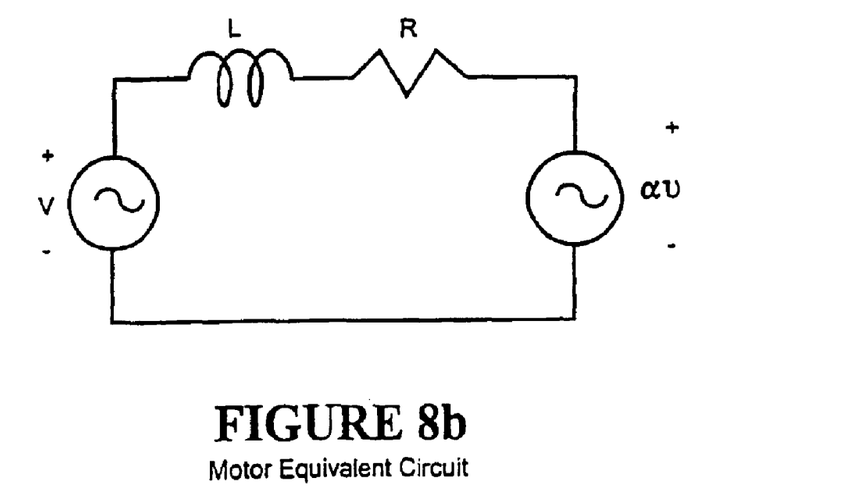
FIG. 8b shows an equivalent circuit for such a motor.

Methods of synchronising the electrical voltage applied to the compressor motor windings with the mechanical system frequency are well known. For a permanent magnet motor used in a free piston compressor, a back electromotive force (back EMF) is induced in the motor windings proportional to the piston velocity as shown in FIG. 8a The equivalent circuit of the motor is shown in FIG. 8b. An alternating voltage (V) is applied in synchronism with the alternating EMF ($\alpha v$) in order to power the compressor. U.S. Pat. No. 4,320,448 (Okuda et al.) discloses a method whereby the timing of the applied voltage is determined by detecting the zero crossings of the motor back EMF. The application of voltage to the motor winding is controlled such that the current is zero, at the time at which the EMF intersects with the zero level to allow back EMF zero crossing detection.

Various methods have been used to limit oscillation amplitude including secondary gas spring, piston position detection, piston position calculation based on current and applied voltage (U.S. Pat. No. 5,496,153) measuring ambient and/or evaporating temperature (U.S. Pat. No. 4,179,899, U.S. Pat. No. 4,283,920). Each of these methods requires the cost of additional sensors or has some performance limitation.

DISCLOSURE OF THE INVENTION

It is an object of the present invention to provide a compact linear motor which goes some way to overcoming the abovementioned disadvantages or which will at least provide the public with a useful choice.

Accordingly in a first aspect the present invention may be said to consist in an electric linear motor for driving a reciprocating load comprising:

a stator having a magnetically permeable core with at least one air gap and means for producing a non constant magnetic flux in said stator and said at least one air gap;

an armature having a structure which supports at least one permanent magnet of which at least a substantial portion is located in at least one of said at least one air gap, such that the interaction of the magnetic field of said at least one permanent magnet and said non constant flux in said at least one air gap producing a force on said armature, said nature in use being connected to said load and thereby reciprocating with respect to said stator, and energisation means for controlling said means for producing an alternating flux such that at least one end of said at least one permanent magnet passes outside the region of substantially uniform flux deity present within said at least one of said at least one air gap during a portion of the reciprocal motion of said armature.

In a second aspect the present invention may be said to consist in a refrigerator which uses a compressor characterised in that the compressor and compressor motor are linear devices and said motor comprises:

a stator having a magnetically permeable core with at least one air gap and means for producing a non constant magnetic flux in said stator and said at least one air gap;

an armature having a structure which supports at least one permanent magnet of which at least a substantial portion is located in at least one of said at least one air gap, such that the interaction of the magnetic field of said at least one permanent magnet and said non constant flux in said at least one air gap producing a force on said armature, said mature in use being connected to said load and thereby reciprocating with respect to said stator, and energisation means for controlling said means for producing an alternating flux such that at least one end of said at least one permanent magnet passes outside the region of substantially uniform flux density present within said at least one of said at least one air gap during a portion of the reciprocal motion of said armature.

In a third aspect the present invention may be said to consist in a vapour compressor comprising:

a piston, a cylinder, said piston being reciprocable within said cylinder, the vibrating system of piston, spring and the pressure of said vapour having a natural frequency which varies with vapour pressure, a linear brushless DC motor drivably coupled to said piston having at least one winding, a DC power supply, commutation means for electronically commutating said at least one winding from said DC supply to provide a supply of current to said at least one winding to reciprocate said piston, resonant driving means which initiate commutation of said at least one winding to thereby drive said piston at the resonant frequency of said vibrating system, current controlling means which determine the amount of said supply of current supplied by said commutation means, said determined amount of current being related to said resonant frequency, and which initiate commutation of said at least one winding to thereby limit the amplitude of reciprocation of said piston.

In a forth aspect the present invention may be said to consist in a method for driving and controlling the amplitude of the piston in a free piston vapour compressor wherein said piston in a cylinder and wherein the vibrating system of piston, spring and the pressure of said vapour has a resonant frequency which varies with vapour pressure, said method using a linear brushless DC motor having at least one winding and comprising the steps of:

electronically commutating said at least one winding form a DC supply to reciprocate said piston, with commutations timed to drive said piston at the resonant frequency of said vibrating limiting the amount of current in said at least one winding by limiting the value of a parameter which determines current supply during commutation to a value which is a function of said resonant frequency.

The "evaporating temperature of the vapour entering the compressor" is also referred to in this specification as the "evaporator temperature". Likewise the "resonant frequency" is also referred to as the "natal frequency".

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

MODE(S) FOR CARRYING OUT THE INVENTION

The present invention provides a method for controlling a linear motor with a number of improvements over the prior art. Firstly it has a reduced size compared to the conventional linear motor of the type described in U.S. Pat. No. 4,602,174 and thus reduces the cost. This change keeps the efficiency high at low to medium power output at the expense of slightly reduced efficiency at high power output. This is an acceptable compromise for a compressor in a household refrigerator which runs at low to medium power output most of the time and at high power output less than 20% of the time (this occurs during periods of frequent loading and unloading of the refrigerator contents or on very hot days). Secondly it uses a control strategy which allows optimally efficient operation, while negating the need for external sensors, which also reduces size and cost.

While in the following description the present invention is described in relation to a cylindrical linear motor it will be appreciated that this method is equally applicable to linear motors in general and in particular also to flat linear motors. One skilled in the art will require no special effort to apply the control strategy herein described to any form of linear motor. It will also be appreciated that the present invention will be applicable in any form of compressor. While it is described in relation to a free piston compressor it could equally be used in a diaphragm compressor.

Figure 1:
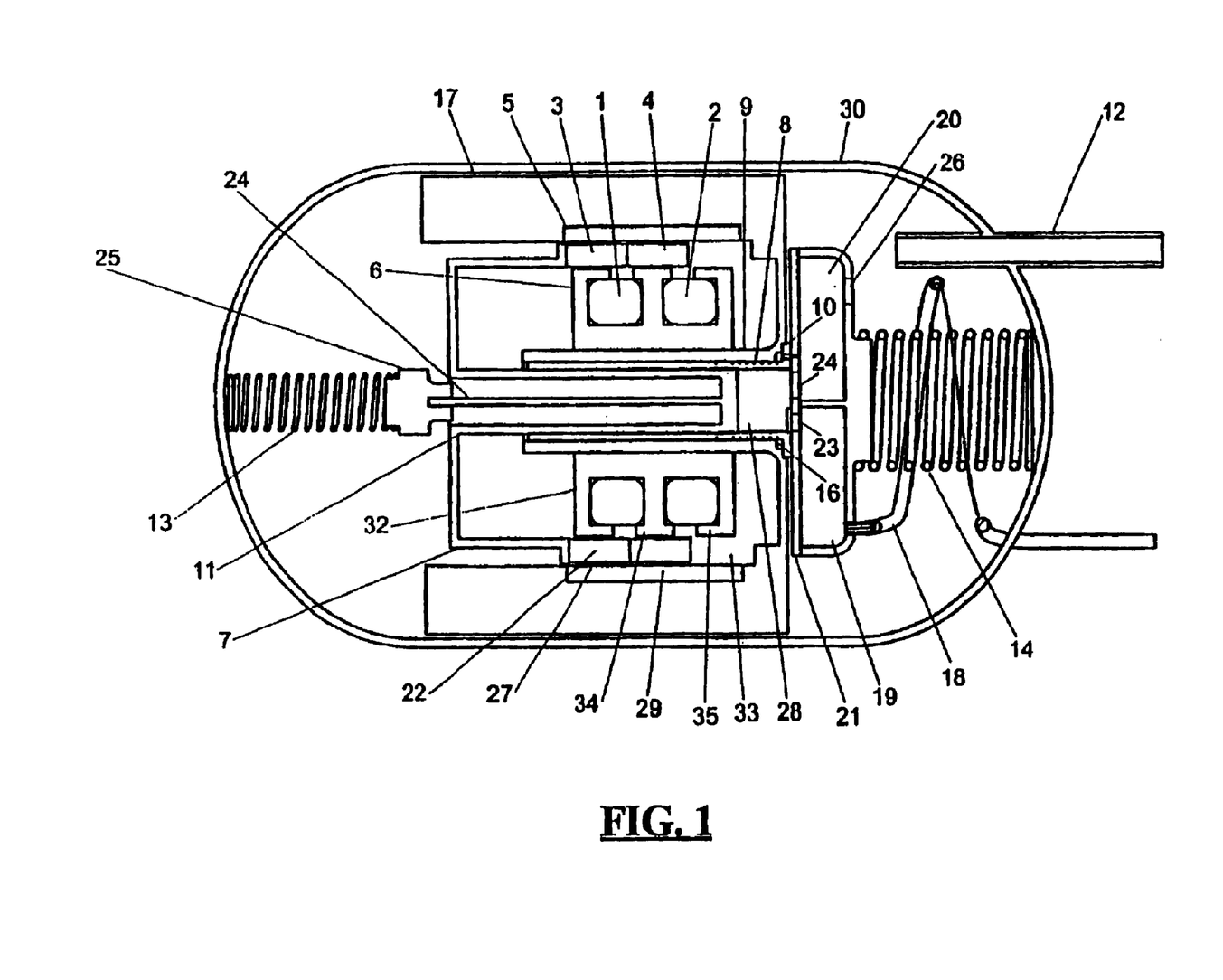
FIG. 1 is a cross-section of a linear compressor according to the present invention.

A practical embodiment of the invention, shown in FIG. 1, involves a permanent magnet linear motor connected to a reciprocating free piston compressor. The cylinder 9 is supported by a cylinder spring 14 within the compressor shell 30. The piston 11 is radially by the bearing formed by the cylinder bore plus its spring 13 via the spring mount 25.

The reciprocating movement of piston 11 within cylinder 9 draws gas in through a suction tube 12 through a suction port 26 through a suction muffler 20 and through a suction valve port 24 in a valve plate 21 into a compression space 28. The compressed gas then leaves through a discharge valve port 23, is silenced in a discharge muffler 19, and exits through a discharge tube 18.

The compressor motor comprises a two part stator 5,6 and an armature 22. The force which generates the reciprocating movement of the piston 11 comes from the interaction of two annular radially magnetised permanent magnets 3,4 in the armature 22 (attached to the piston 11 by a flange 7), and the magnetic field in an air gap 33 (induced by the stator 6 and coils 1,2).

Figure 2:
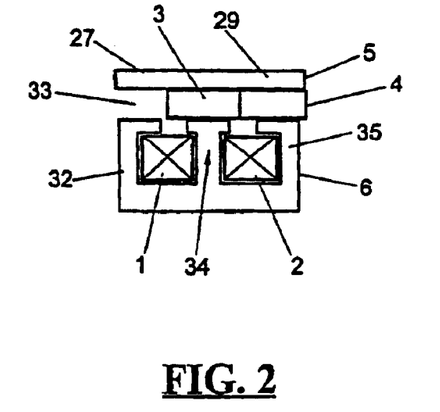
FIG. 2 is a cross-section of the double coil linear motor of the present invention in isolation.

A two coil embodiment of present invention, shown in FIG. 1 and in isolation in FIG. 2, has a current flowing in coil 1, which creates a flux that flows axially along the inside of the stator 6, radially outward through the end stator tooth 32, across the air gap 33, then enters the back iron 5. Then it flows axially for a short distance 27 before flowing radially inwards across the air gap 33 and back into the centre tooth 34 of the stator 6. The second coil 2 creates a flux which flows radially in through the centre tooth 34 across the a gap axially for a short distance 29, and outwards through the air gap 33 into the end tooth 35. The flux crossing the air gap 33 from tooth 32 induces an axial force on the radially magnetised magnets 3,4 provided that the magnetisation of the magnet 3 is of the opposite polarity to the other magnet 4. It will be appreciated that instead of the back iron 5 it would be equally possible to have another set of coils on the opposite sides of the magnets.

An oscillating current in coils 1 and 2, not necessarily sinusoidal, creates an oscillating force on the magnets 3,4 that will give the magnets and stator substantial relative movement provided the oscillation frequency is close to the natural frequency of the mechanical system. This natural frequency is determined by the stiffness of the springs 13, 14 and mass of the cylinder 9 and stator 6. The oscillating force on the magnets 3,4 creates a reaction force on the stator parts. Thus the stator 6 must be rigidly attached to the cylinder 9 by adhesive, shrink fit or clamp etc. The back iron is clamped or bonded to the stator mount 17. The stator mount 17 is rigidly connected to the cylinder 9.

Figure 3:
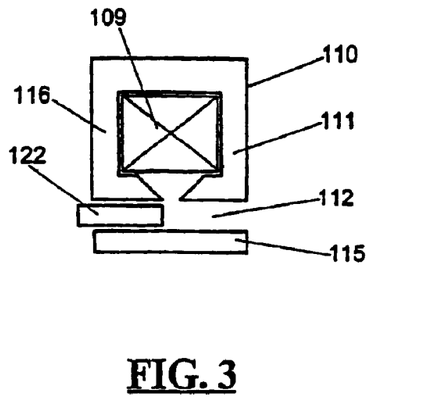
FIG. 3 is a cross-section of a single coil linear motor.

In a single coil embodiment of the present invention, shown in FIG. 3, current in coil 109, creates a flux that flows axially along the inside of the inside stator 110, radially outward through one tooth 111, across the magnet gap 112, then enters the back iron 115. Then it flows axially for a short distance before flowing radially inwards across the magnet gap 112 and back into the outer tooth 116. In this motor the entire magnet 122 has the same polarity in its radial magnetisation.

Figure 4:
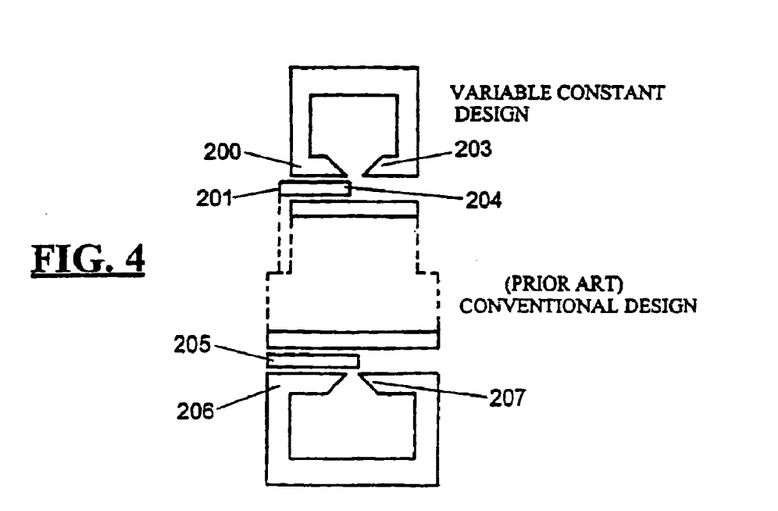
FIG. 4 is a comparison between a single window prior art linear motor and a short stator linear motor according to the present invention.

In the preferred embodiment of the present invention the length of the armature (tooth) faces only extends to, for example, 67% of the maximum stroke (where the edge of the magnet extends to at maximum power output) of the magnet. Tis is seen in FIG. 4 where a conventional prior art linear motor is visually compared against the present invention variable constant design of equivalent power output, both at maximum stroke. It can be seen that the outer edge 200 of the stator tooth does not extend as far as the outer end of the magnet 201. Similarly the inner edge 203 of the other stator tooth does not extend to the inner end of the magnet 204. In contrast in the prior art design the edge of the magnet 205 does match up with the edges of the stator teeth 206,207 at maximum stroke.

Figure 5:
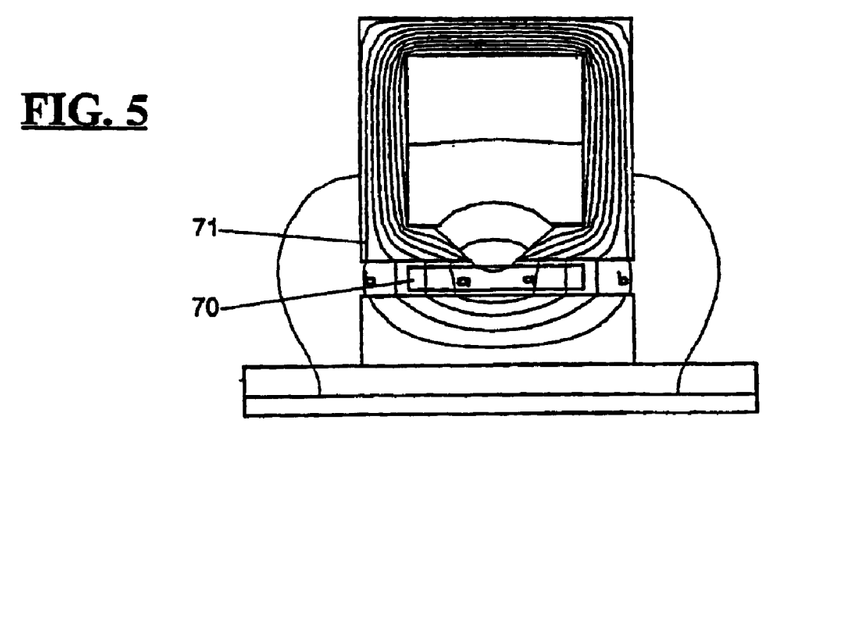
FIG. 5 is an illustration of the flux lies due to the coil current in a single coil linear motor of the present invention.

At strokes less than, for example, 60% in the present invention the magnet 70 will be in an area of uniform flux density as indicated by the region "a" to "b" in FIG. 5, which roughly corresponds where the stator teeth 71 extend to. As the stroke increases past 60% the flux density encountered by the magnet edge 70 reduces as it enters the fringe portion (non-uniform flux density) of the air gap magnetic field—the area outside "b" in FIG. 5.

Figure 7:
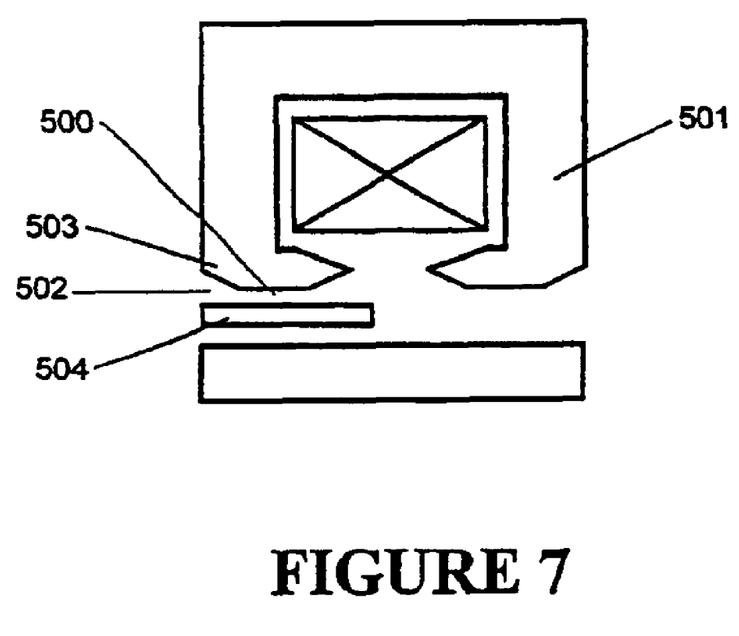
FIG. 7 is a cross-section of a single coil linear motor with partially angled pole faces.

In a further embodiment shown in FIG. 7, a stator for a linear motor is shown with angled pole face 503. In its centre the pole face 503 has a flat section 500, which results in the air gap facing that section having substantially uniform flux density. The end of the pole face 503, is angled to give a more progressive transition from the uniform flux density of the centre 500, to the fringe portion 502 (non-uniform flux density) at the end of the pole face 503. Similar to the proceeding embodiments the armature magnet 504, would be driven outside the area of uniform flux density 500, and into the fringe portion 502 of non-uniform flux density.

Figure 6:
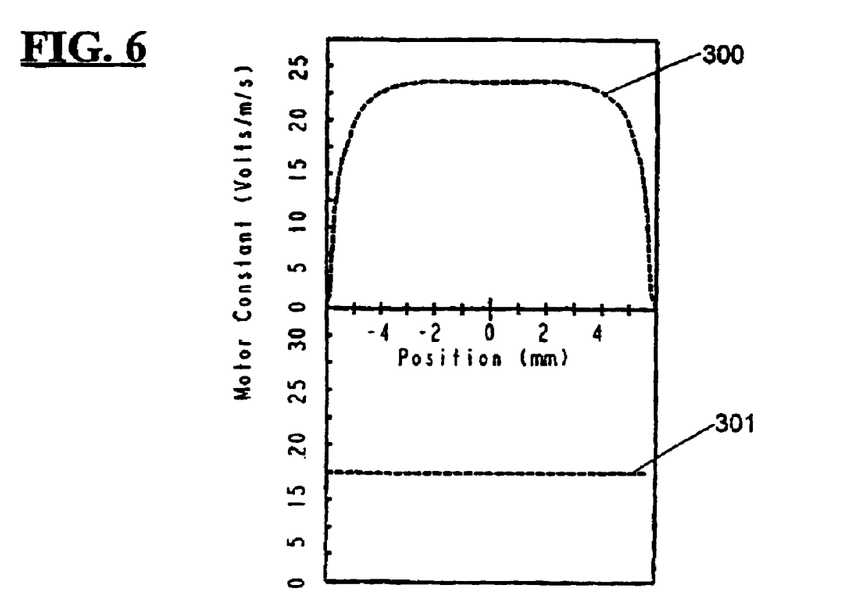
FIG. 6 is a graph of the motor constant versus magnet position for the preferred embodiment of the present invention.

The "Motor Constant" is defined as the force (in Newtons) generated on the magnet by one Ampere in the motor windings. The motor constant curve, shown in FIG. 6 shows how the Motor Constant 300 for the present invention varies with magnet position. Equally the "Motor Constant" be defined as the back EMF (in Volts) generated when the magnet is moving at one meter/second. When the magnet is in the fringe field (outside "b" in FIG. 5), because of the reduced magnetic coupling, more current will be required to generate a given force when compared to that in the uniform flux region (from "a" to "b" in FIG. 5). This results in the "variable" motor constant curve 300 associated with the present invention short stator linear motor as shown in FIG. 6. This contrast with the "constant" motor constant curve 301, also seen in FIG. 6, inherent in the conventional prior art linear motors.

With the motor constant curve 300 shown in FIG. 6 at low and medium strokes (corresponding to strokes of −3 mm to +3 mm) it will be apparent the present invention has a high motor constant relative to an equivalent convention motor 301, (with less turns and a greater volume of core material). A higher motor constant corresponds to more efficient operation (due to lower inventor losses), therefore at lower power output the present invention is more efficient than an equivalent conventional prior art linear motor. It also reduces the required cross sectional area of the core.

At high strokes the motor constant is low at the times when the current is increasing most rapidly. This makes it possible to get more current into the motor and thus extract more power from the motor at maximum strokes as compared to an equivalent conventional prior art linear motor. Also such a design with a variable constant that is lowest at maximum stroke tends to make motors driven by square wave voltages more efficient.

Control Strategy

Experiments have established that a five piston compressor is most efficient when driven at the natural frequency of the compressor piston-spring so. However as well as any deliberately provided metal spring, there is an inherent gases spring, the effective spring constant of which, in the case of a refrigeration compressor, varies as either evaporator or condenser pressure varies. The electrically commutated permanent magnet motor already described, is controlled using techniques including those derived from the applicant's experience in electronically commutated permanent magnet motors as disclosed in U.S. Pat. No. 4,857,814 and WO 98/35428 for example, the contents of which are incorporated herein by reference. Those references disclose the control of a 3 phase rotating motor, but the same control principles can be applied to linear motors. A suitable linear motor need only be a single phase device and a suitable inverter bridge circuit for powering a motor can be of the simple form shown in FIG. 9.

Figure 9:
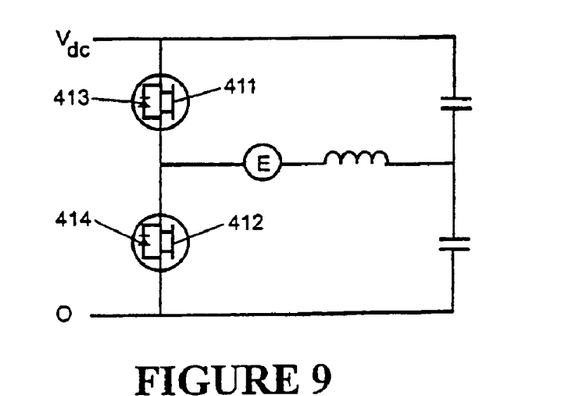
FIG. 9 shows an inverter for electronically commutating a single phase free piston motor.

By monitoring back EMF zero crossings in the motor winding current commutation can be determined to follow the natural frequency of the piston. Since there is only a single winding, the current flowing through either or lower inverter switching devices 411 or 412 must be interrupted so that back EMF can be measure. Controlling the current through the motor winding in accordance with detect back EMF ensures current and back EMF are maintained in phase for =system efficiency.

The frequency of operation of the motor is effectively continuously monitored as frequency is twice the reciprocal of the time between back EMF zero crossings. Furthermore according to WO 98/35428 the current decay time through free wheel diodes 413 and 414 after commutation has ceased is directly proportional to the motor current and thus a measure of motor current is available.

Figure 10:
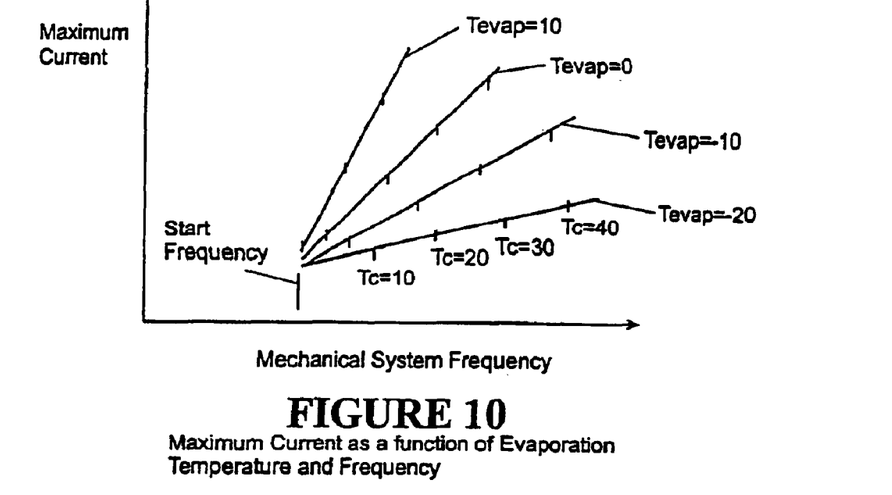
FIG. 10 shows graphs of maximum motor current as a function of frequency and evaporation temperature for a motor of the present invention.

The maximum motor current that can be employed before the piston collides with the cylinder head of the compressor varies depending upon the evaporator temperature and the natural frequency of the vibrating system FIG. 10 shows graphs of maximum permitted motor current against natural mechanical system frequency and condenser temperatures for different evaporating temperatures. These show the dependence of maximum motor current on both these variables. They also demonstrate that condenser temperatures are proportional to mechanical system frequency and thus maximum current control can be achieved without the need for measurement of the third variable, condenser temperature.

Figure 11:
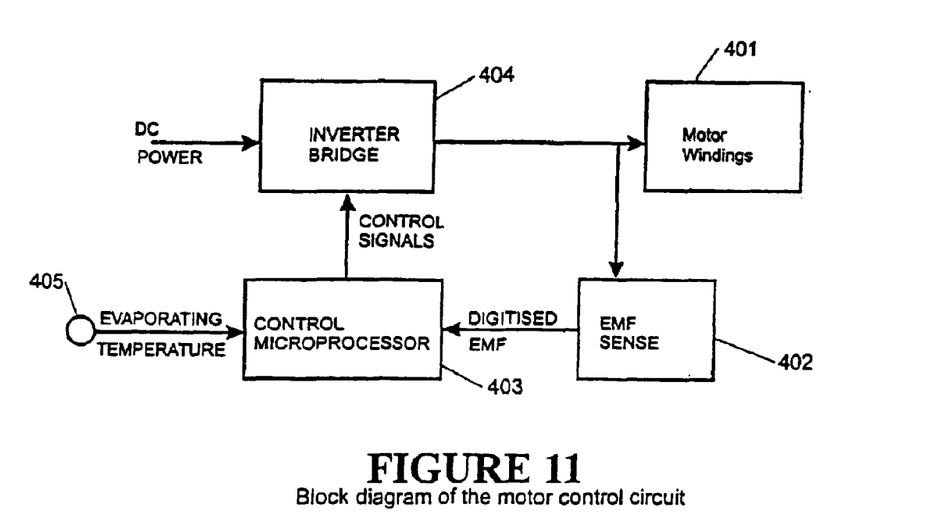
FIG. 11 is a block diagram of the motor control circuit.

The motor control circuit according to this invention is shown in FIG. 11. It utilises the observation that mechanical system frequency is related to condenser temperature. In this invention the back EMF signal induced in the motor windings 1 is sensed and digitised by circuit 402 and applied to the input of a microcomputer 403 which computes the appropriate timing for the commutation of current to the motor windings to ensure that the current is in phase with the back EMF. These commutation tuning signals switch an inverter 404 (as shown in FIG. 11) which delivers current to the motor windings 401. The microcomputer 403 also measures the time between back EMF zero crossings and thereby the period of the EMF waveform. The natal oscillation frequency of the mechanical system is the inverse of the period of the EMF waveform. The microcomputer 403 therefore has a measure of this frequency at all times.

The conventional temperature sensor 405 for measuring the evaporator temperature for defrost purposes is utilised and its output is digitised and supplied as a further input to microcomputer 403.

Figure 12:
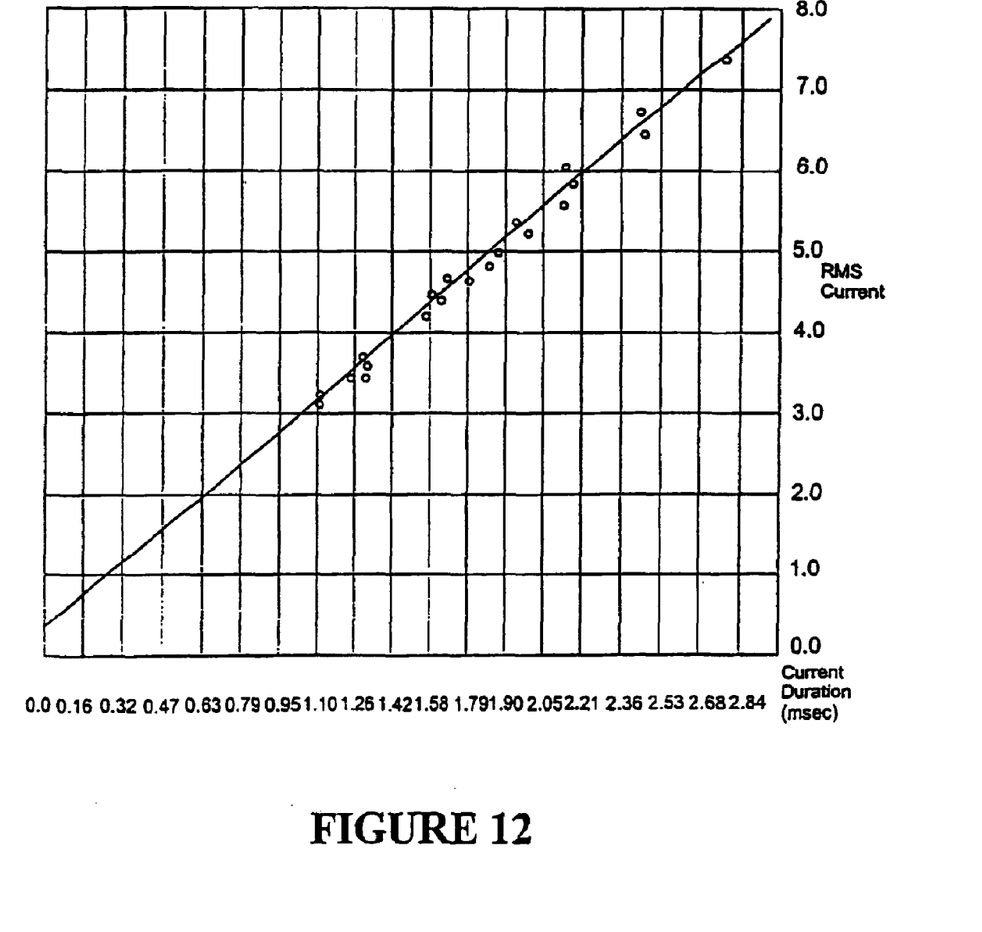
FIG. 12 is a graph of RMS motor current versus motor winding current decay time.

According to the present invention one method of limiting maximum motor current and thus displacement of the piston is for the microcomputer 403 to calculate a maximum current amplitude for each half cycle of piston oscillation and limit the actual current amplitude to less than the maximum. WO 98/35428 discloses a method of measuring motor current in an electronically commutated permanent magnet motor by utilising the digitised back EMF signal in an unpowered winding to measure the time taken for the current in the motor winding to decay to zero. Use of this technique in the present invention enables microcomputer 403 to limit maximum power without the need for dedicated current sensing or limiting circuitry. The RMS motor current is directly proportional to the time duration of current decay through the "freewheeling" diodes 413 or 414 after the associated inverter switching device has switched off. The current decay results of course from the motor winding being an inductor which has stored energy during commutation and which must be dissipated after commutation has ceased. A graph of RMS motor current against current decay duration (which is a simplification of FIG. 6 in WO 98/35428) is shown in FIG. 12.

Figure 15:
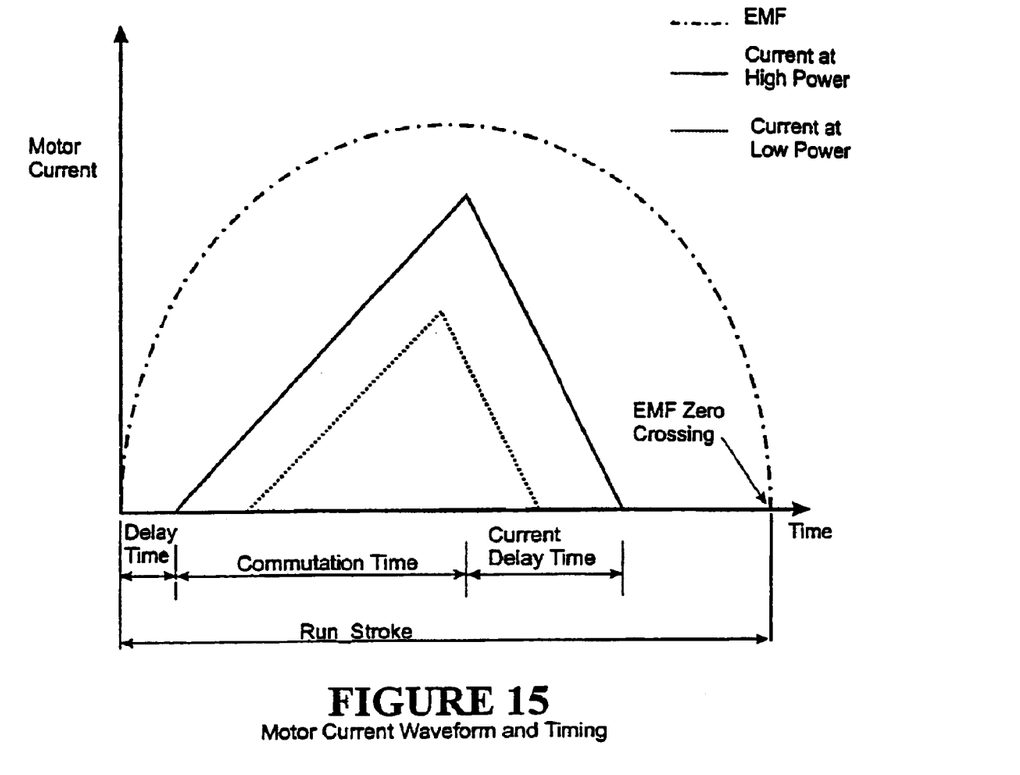
FIG. 15 shows motor piston displacement and motor current waveforms.

Another preferred method is to limit the time that the current is commutated on instead of limiting the maximum current value. FIG. 15 shows the current waveform under such control. This is in effect pulse width modulation (PWM) with only one modulated current pulse per commutation interval. With this method a delay time from the back EMF zero crossing is computed to minimise the phase angle between the Motor Current and the back EMF for maximum efficiency. The invertor switch supplying current is turned off at a time in the motor half cycle to allow, after a current decay period, time to monitor zero crossing of the back EMF to determine the start commutation for the next half cycle. The commutation time is also compared with a maximum commutation time appropriate to the motor frequency and evaporator temperature to ensure maximum amplitude of the piston stroke is not exceeded.

Figure 13:
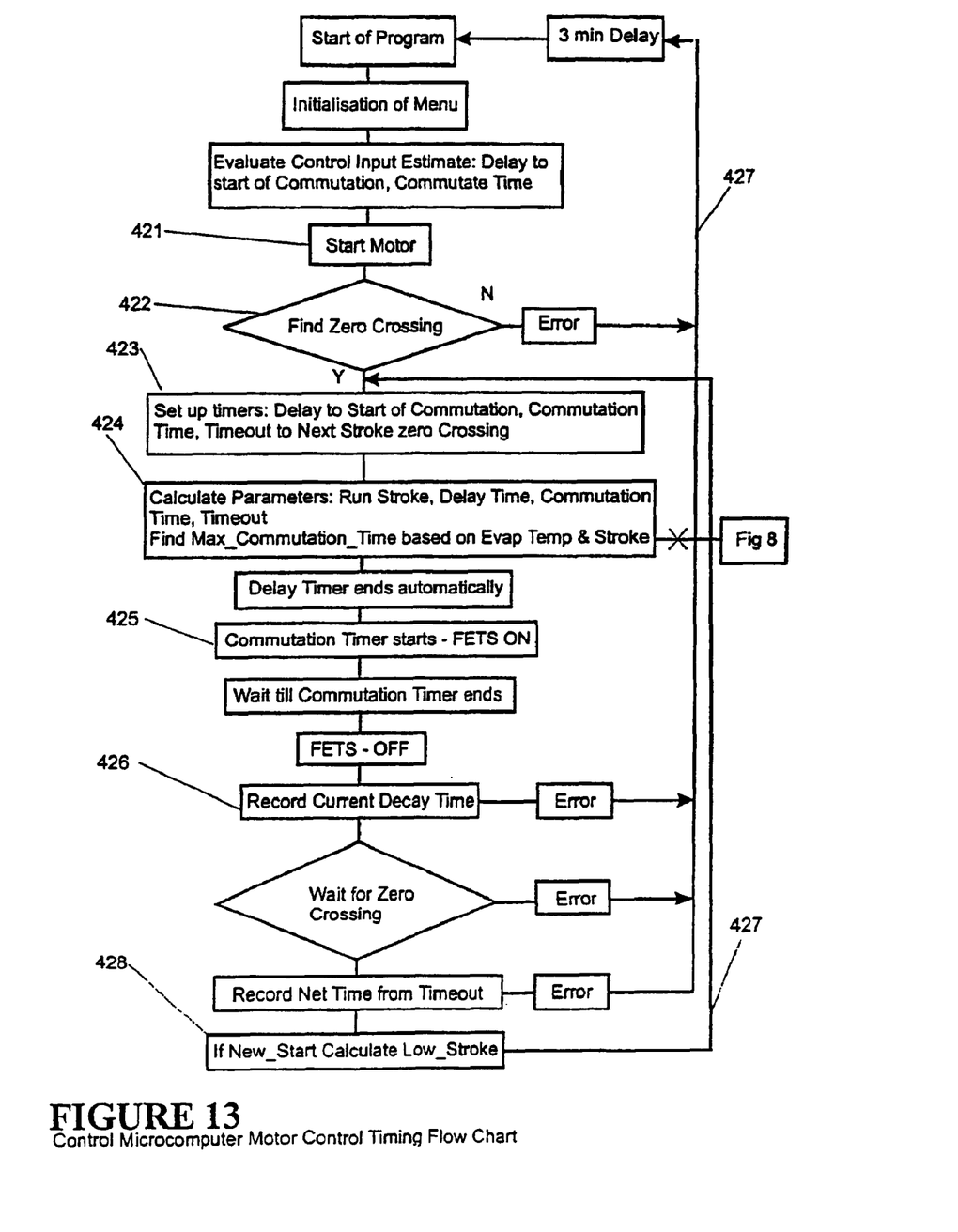
FIG. 13 is a flow chart of the motor control timing program.
Figure 14:
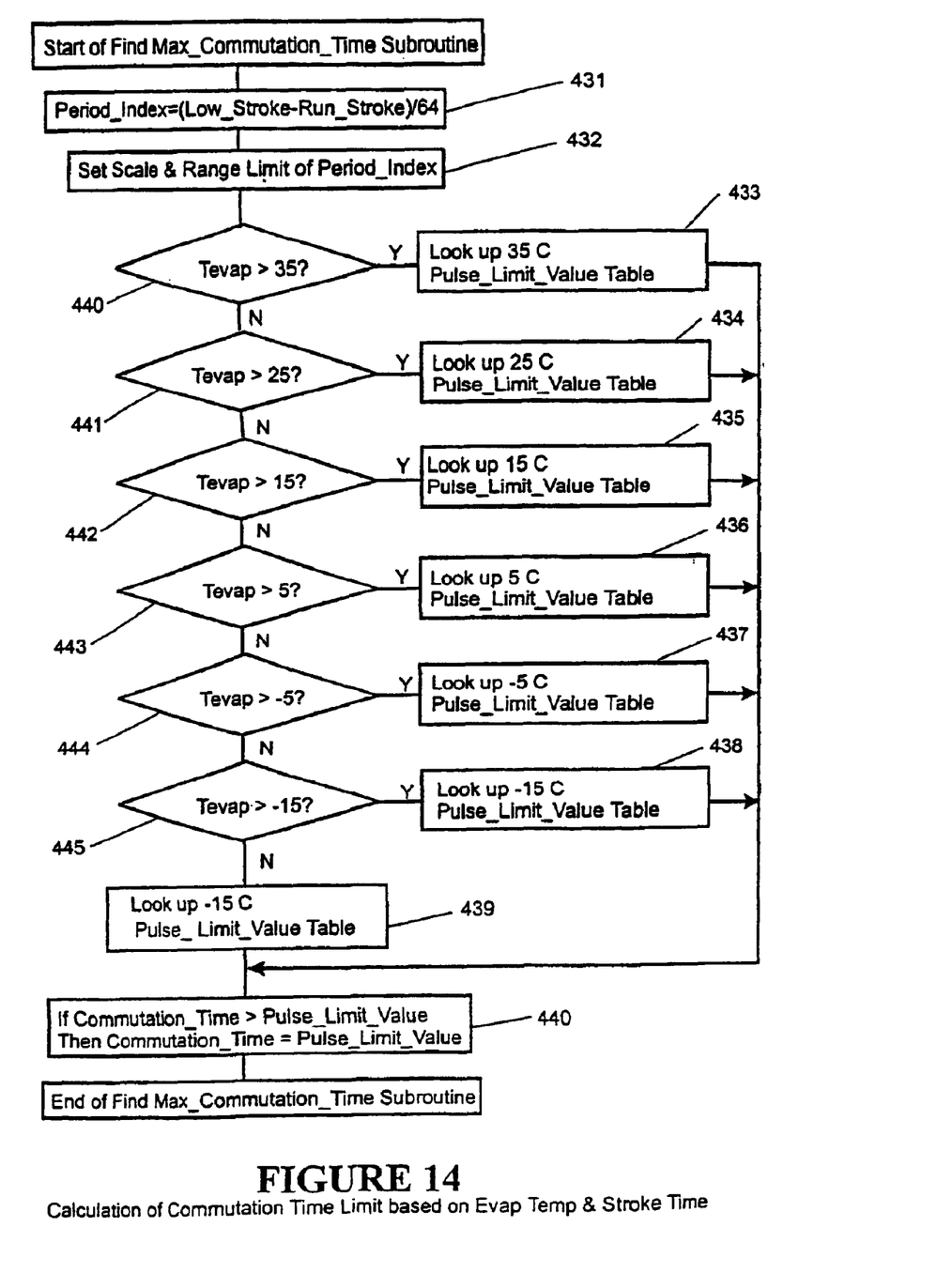
FIG. 14 is a flow chart of commutation time determination using evaporator temperature and stroke time data.

A flow diagram of the microcomputer control strategy to implement this method is shown in FIGS. 13 and 14. Referring to FIG. 13 when the compressor is first powered (421), or is powered after sufficient time delay to ensure pressures are equalised in the refrigeration system, the compressor runs at a minimum frequency. The stroke period of this minimum frequency is measured as Run_Stroke and shown in the microcomputer as Low_Stroke and a minimum Commutation Time is set for this value (428). For each subsequent stroke the stroke period is measured and defined as the parameter Run_Stroke (424). The difference between Run_Stroke and Low_Stroke is computed (431, FIG. 14). This difference is called Period_Index. The Period_Index is used in this sub-routine as an index pointer in a lookup table of maximum commutation times for different stroke times (frequencies). This table is called the Pulse_Limit_Value Table. In this instance there are 7 lookup tables (433 to 439) corresponding to 7 ranges of Evaporating Temperature (440 to 465).

The motor control circuit is typically included in a Temperature Control loop in the conventional manner in order to maintain the temperature of the enclosed refrigerated space of the refrigeration system. This control loop will be setting desired values for the power to be applied to the motor windings depending on the operating conditions of the refrigeration system. These values of desired power will correspond to values of commutation time. These values of Commutation Time are compared on a stroke by stroke basis with the Pulse_Limit_Value (440, FIG. 14). If the Desired value of commutation time is greater than the Pulse Limit Value then the commutation time is limited to the Pulse Limit_Value. This value sets the Commutation Timer (425) which controls the ON period of the relevant inverter switching device. As previously explained, Motor Current can also be used in a similar manner to limit power applied to the motor to safe levels, but even where commutation time is being controlled it is desirable to measure motor current in the manner previously described and compare it with a stored absolute maximum value (426) which if exceeded will cause the microcomputer program to reset (427).

Of course other methods of determining maximum commutation time and/or maximum current value are feasible, for instance if the microcomputer is sufficiently powerful, for example recent advances in DSP chip technology, these values can be computed directly without the need for lookup tables.

If the DC power supply Voltage supplied to the inverter bridge of FIG. 9 varies significantly this will result in variation of Motor Current for any given commutation time which should be allowed for. It may be desirable for maximum accuracy for the microprocessor to sense this and compensate accordingly It will be appreciated that use of the present invention in a refrigerator reduces the profile, size and weight of the motor compared to that of conventional designs. Also because the mass of the moving parts is lower than that of a conventional refrigerator compressor:

the level of vibration is reduced, the noise level is reduced, the working stresses on the moving parts are reduced.

What is claimed is:

1. A method for driving and controlling the amplitude of the piston in a free piston vapor compressor wherein said piston reciprocates in a cylinder and wherein the vibrating system of piston, spring and the pressure of said vapor has a resonant frequency which varies with vapor pressure, said method using a linear brushless DC motor having at least one winding and comprising the steps of:

electronically commutating said at least one winding from a DC supply to reciprocate said piston, with computations timed to drive said piston at the resonant frequency of said vibrating system, limiting the amount of current in said at least one winding by limiting the value of a parameter which determines current supply during commutation to a value which is a function of said resonant frequency.

2. A method as claimed in claim 1 further comprising the step of measuring a property of the vapor entering the compressor which is an indicator of the pressure, wherein said selected maximum current commutation value is also a function of said measured indicative property.

3. A method as claimed in claim 2 further characterised in that said measured indicative property is an indicator of the pressure on evaporation.

4. A method as claimed in any one of claims 1 to 3 further characterised in that said step of driving said piston at the resonant frequency of said vibrating system comprises the steps of:

unpowering said at least one winding at various intervals and detecting zero-crossings of the back EMF induced in said at least one winding, using the zero-crossing timing information to initiate commutation of said at least one winding to thereby drive said piston at the resonant frequency of said vibrating system.

5. A method as claimed in claim 4 further characterised in that said step of electronic commutation comprises using commutation means includes switching devices connected to said DC power supply to supply current to said at least one winding and unidirectional current devices which supply a current path to dissipate energy stored in each winding after supply of current through a switching device has terminated, measuring motor current based on intervals between those zero crossings of said back EMF, which represent the duration of a current pulse produced in said at least one winding due to dissipation of stored energy by said unidirectional current devices after supply of current has been removed from said at least one winding, and terminating commutation when said measured current reaches said determinated amount of current.

6. A method as claimed in either claim 2 or 3 further comprising a step of measuring a property of the vapor entering the compressor which is an indicator of the pressure on evaporation, wherein said maximum current commutation value is selected from one of a set of look up tables containing maximum current commutation values for each of a plurality of resonant frequencies for said vibrating system and selecting the value which corresponds to the measured resonant frequency, each look up table corresponding to a non-overlapping range of said indicative property and being selected on the basis of the measured value of said indicative property.

7. A method according to claim 6 further characterised in that said parameter which is limited is the magnitude of the current and said look up tables store maximum current values.

8. A method according to claim 6 further characterised in that parameter which is limited is the duration of commutation and said look up tables store maximum commutation duration values.

9. A method according to claim 1 further characterised in that instead of said piston and said cylinder said compressor is a diaphragm type compressor.

10. A method as claimed in claim 1 further comprising the steps of measuring a property of the vapor entering the compressor which is an indicator of evaporating pressure, and calculating said value of said parameter which determines currently supply during commutation from said resonant frequency and said vapor property.

11. A method as claimed in claim 10 wherein said measured vapor property is the vapor temperature.

12. A method according to claim 11 wherein said parameter which determines current supply during commutation is the magnitude of the current in said at least one winding.

13. A method according to claim 11 wherein said parameter which determines current supply during commutation is the duration of the current in said at least one winding.

* * * * *

UNITED STATES PATENT AND TRADEMARK OFFICE
CERTIFICATE OF CORRECTION

PATENT NO.      : 6,864,647 B2
DATED           : March 8, 2005
INVENTOR(S)     : Gerald David Duncan and John Henry Boyd It is certified that error appears in the above-identified patent and that said Letters Patent is hereby corrected as shown below:

Title page,
Item [75], Inventor, "John Henry Boyd, Holland, MO (US)" should be
-- John Henry Boyd, Holland, MI (US) --
Item [56], References Cited, U.S. PATENT DOCUMENTS, The following US Patents do not appear in the original patent
-- 5,592,057    01/1997     Kordik
6,077,054       06/2000     Lee et al.
5,945,748       08/1999     Park et al.
6,657,326       12/2003     Yamamoto et al.
6,536,326       03/2003     Unger et al. --

Column 1,
Line 65 "ten powering" should be -- system powering --

Column 2,
Line 50, "deity" should be -- density --

Column 3,
Line 48, "vibrating limiting" should be -- vibrating system, limiting --
Line 56, " "natal frequency" should be -- "natural frequency" --

Column 5,
Line 58, "Tis is" should be -- This is --

Column 6,
Line 55, "five piston" should be -- free piston --
Line 57, "so. " should be -- system. --

Column 7,
Line 14, "for=system" should be -- for maximum system --

Column 8,
Lines 54-55, "Pulse Limit Value" should be -- Pulse_Limit_Value --
Lines 55-56, "Pulse Limit_Value." should be -- Pulse_Limit_Value -☐
Line 58, "Current" should be -- current --

UNITED STATES PATENT AND TRADEMARK OFFICE
CERTIFICATE OF CORRECTION

PATENT NO. : 6,864,647 B2
DATED : March 8, 2005
INVENTOR(S) : Gerald David Duncan and John Henry Boyd It is certified that error appears in the above-identified patent and that said Letters Patent is hereby corrected as shown below:

<u>Column 9,</u>
Lines 29-30, "computations" should be -- commutations --

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO.      : 6,864,647 B2
DATED           : March 8, 2005
INVENTOR(S)     : Gerald David Duncan and John Henry Boyd It is certified that error appears in the above-identified patent and that said Letters Patent is hereby corrected as shown below:

<u>Title page,</u>
Item [75], Inventor, "John Henry Boyd, Holland, MO (US)" should be
-- John Henry Boyd, Holland, MI (US) --.
Item [56], References Cited, U.S. PATENT DOCUMENTS, The following US Patents do not appear in the original patent
-- 6,077,054     06/2000       Lee et al.
   5,945,748    08/1999       Park et al.
   6,657,326    12/2003       Yamamoto et al. --.

<u>Column 1,</u>
Line 65 "ten powering" should be -- system powering --.

<u>Column 2,</u>
Line 50, "deity" should be -- density --.

<u>Column 3,</u>
Line 48, "vibrating limiting" should be -- vibrating system, limiting --.
Line 56, " "natal frequency" should be -- "natural frequency" --.

<u>Column 5,</u>
Line 58, "Tis is" should be -- This is --.

<u>Column 6,</u>
Line 55, "five piston" should be -- free piston --.
Line 57, "so. " should be -- system. --.

<u>Column 7,</u>
Line 14, "for=system" should be -- for maximum system --.

<u>Column 8,</u>
Lines 54-55, "Pulse Limit Value" should be -- Pulse_Limit_Value --.
Lines 55-56, "Pulse_Limit_Value." should be -- Pulse_Limit_Value --.
Line 58, "Current" should be -- current --.

UNITED STATES PATENT AND TRADEMARK OFFICE
CERTIFICATE OF CORRECTION

PATENT NO. : 6,864,647 B2
DATED : March 8, 2005
INVENTOR(S) : Gerald David Duncan and John Henry Boyd

It is certified that error appears in the above-identified patent and that said Letters Patent is hereby corrected as shown below:

<u>Column 9,</u>
Lines 29-30, "computations" should be -- commutations --.

This certificate supersedes Certificate of Correction issued June 28, 2005.

Signed and Sealed this

Sixth Day of September, 2005

JON W. DUDAS
*Director of the United States Patent and Trademark Office*